(12) United States Patent
Toskala et al.

(10) Patent No.: US 10,027,453 B2
(45) Date of Patent: Jul. 17, 2018

(54) USER EQUIPMENT ASSISTED DEPLOYMENT IN AN UNLICENSED BAND

(71) Applicant: NOKIA SOLUTIONS AND NETWORKS OY, Espoo (FI)

(72) Inventors: Antti Anton Toskala, Espoo (FI); Sari Nielsen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 83 days.

(21) Appl. No.: 15/101,243

(22) PCT Filed: Dec. 3, 2013

(86) PCT No.: PCT/EP2013/075298
§ 371 (c)(1),
(2) Date: Jun. 2, 2016

(87) PCT Pub. No.: WO2015/081984
PCT Pub. Date: Jun. 11, 2015

(65) Prior Publication Data
US 2016/0301504 A1    Oct. 13, 2016

(51) Int. Cl.
| *H04W 4/00*  | (2018.01) |
| *H04L 5/00*  | (2006.01) |
| *H04W 16/14* | (2009.01) |
| *H04W 48/16* | (2009.01) |
| *H04W 56/00* | (2009.01) |
| *H04W 72/04* | (2009.01) |
| *H04W 72/12* | (2009.01) |

(52) U.S. Cl.
CPC .............. *H04L 5/0032* (2013.01); *H04L 5/00* (2013.01); *H04W 16/14* (2013.01); *H04W 48/16* (2013.01); *H04W 56/001* (2013.01); *H04W 72/0426* (2013.01); *H04W 72/12* (2013.01)

(58) Field of Classification Search
CPC .... H04L 5/0032; H04L 5/00; H04W 72/0426; H04W 56/001; H04W 48/16; H04W 16/14; H04W 72/12
See application file for complete search history.

(56) References Cited

U.S. PATENT DOCUMENTS

| 2012/0282942 A1* | 11/2012 | Uusitalo | ............... H04W 16/14 455/452.2 |
| 2014/0226609 A1* | 8/2014 | Hooli | .................... H04W 16/14 370/329 |

FOREIGN PATENT DOCUMENTS

WO    WO 2012/021098 A1    2/2012

OTHER PUBLICATIONS

International Search Report dated Sep. 24, 2014 corresponding to International Patent Application No. PCT/EP2013/075298.
(Continued)

*Primary Examiner* — Afshawn M Towfighi
(74) *Attorney, Agent, or Firm* — Squire Patton Boggs (US) LLP

(57) ABSTRACT

A user apparatus having a primary cell on a licensed band is requested to scan an unlicensed band, the scanning being performed with a raster. The thus obtained availability of the unlicensed band is used for determining a secondary cell. To improve the reparation of the traffic between the primary cell and the secondary cell, timing information measurements are carried out which can be exploited to avoid interferences between the primary and the secondary cell.

18 Claims, 3 Drawing Sheets

(56) References Cited

OTHER PUBLICATIONS

European Office Action application No. 13 799 057.8 dated Jul. 28, 2017.
European Office Action corresponding to Appln. No. 13 799 057.8, dated Dec. 20, 2017.

* cited by examiner

US 10,027,453 B2

USER EQUIPMENT ASSISTED DEPLOYMENT IN AN UNLICENSED BAND

FIELD

The present invention relates to wireless communication.

BACKGROUND ART

The following description of background art may include insights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

In recent years, the phenomenal growth of mobile Internet services and proliferation of smart phones and tablets has increased a demand for mobile broadband services, and hence more network capacity is required. One possibility to increase network capacity is offloading some of the macro user traffic to cells on unlicensed spectrum. For example, within the $3^{rd}$ Generation Partnership Project (3GPP) specifying modern cellular communication systems, usage of additional bands for a carrier aggregation (CA) configuration has raised interest. The basic idea behind this concept is to expand bandwidth of a cellular network by accessing additional frequency bands. The cellular communication system may thus employ a primary cell (PCell) comprising a primary carrier on its licensed frequency band and create a new carrier on such an additional frequency band as a secondary cell (SCell).

SUMMARY

A general aspect of the invention provides a blind scanning of unlicensed band to detect interference situation on the unlicensed band. Various aspects of the invention comprise methods, an apparatus and a computer program product as defined in the independent claims. Further embodiments of the invention are disclosed in the dependent claims.

BRIEF DESCRIPTION OF THE DRAWINGS

In the following, embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any access network/system and apparatus that supports deployment of one or more unlicensed bands to provide wireless access. Examples of such access systems/networks include LTE (Long Term Evolution) access system, Worldwide Interoperability for Microwave Access (WiMAX), Wireless Local Area Network (WLAN), High Speed Packet Access (HSPA), LTE Advanced (LTE-A), and beyond LTE-A. The specifications of different systems and networks, especially in wireless communication, develop rapidly. Such development may require extra changes to an embodiment. Therefore, all words and expressions should be interpreted broadly and they are intended to illustrate, not to restrict, the embodiment.

Below different exemplary embodiments are explained using LTE-A to provide the access network, without limiting the examples and the invention to such a solution.

Figure 1:
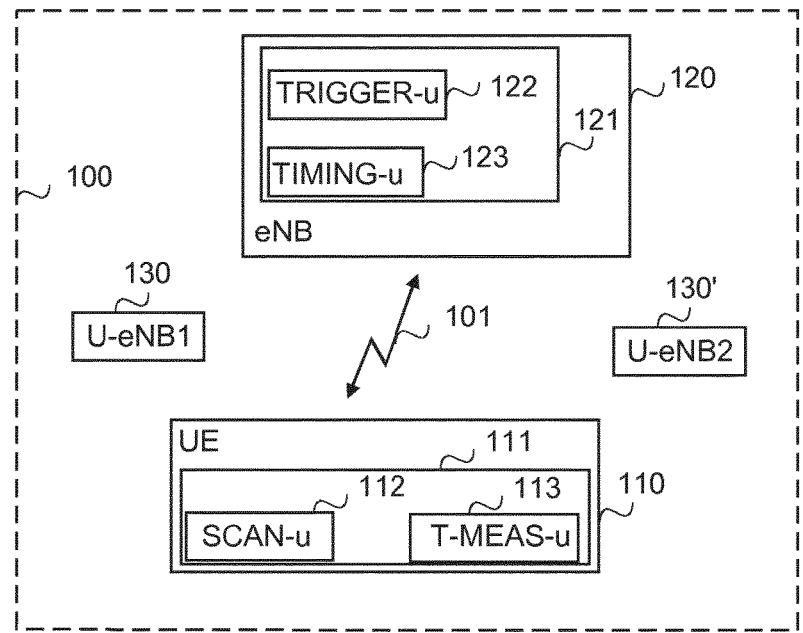
FIG. 1 shows simplified architecture of a system and block diagrams of some apparatuses according to an exemplary embodiment.

A general architecture of an exemplary radio access system 100 is illustrated in FIG. 1. FIG. 1 is a simplified system architecture only showing some elements and functional entities, all being logical units whose implementation may differ from what is shown. It is apparent to a person skilled in the art that the system may also comprise other functions and structures that are not illustrated, for example connections to the core network/system.

The exemplary radio access system 100 illustrated in FIG. 1 comprises user equipments 110 (only one illustrated in FIG. 1), base stations 120 (only one illustrated in FIG. 1) providing at least one or more licensed cells that are operating on a licensed frequency band, such as 2.6 GHz, and base stations 130, 130' providing one or more unlicensed cells that are operating on an unlicensed frequency band, for example with 5.8 GHz).

The user equipment (UE) 110 refers to a portable computing device (apparatus), and it may also be referred to as a user terminal. Such computing devices (apparatuses) include wireless mobile communication devices operating with or without a subscriber identification module (SIM) in hardware or in software, including, but not limited to, the following types of devices: mobile phone, smart-phone, personal digital assistant (PDA), handset, laptop computer, e-reading device, tablet. In the example of FIG. 1, the user equipment 110 is connected over a link 101 to the base station 120 operating on the licensed band and providing a primary cell to the user equipment 110. However, it should be appreciated that also a base station operating on the unlicensed band may provide the primary cell to the user equipment 110.

The user equipment 110 is configured to assist in deployment of unlicensed cells. For that purpose the user equipment 110 comprises an assisting unit 111 that comprises, as sub-units, a scanning unit (SCAN-u) 112 and a time measurement unit (T-MEAS-u) 113 whose functionality will be described in more detail below. Although the units are depicted as separate units, it should be appreciated that the units may be integrated with each other.

In the example of FIG. 1, an evolved node B (eNB) 120 depicts a base station providing the primary cell (PCell) to the user equipment 110. In the illustrated example, the base station 120 is configured to operate with the licensed frequency band but the base station 120 may also be configured to operate on the unlicensed frequency band providing secondary cells with unlicensed spectrum, either with a downlink only as a supplemental downlink or with TDD (time division duplexing) operation including uplink and/or downlink transmissions, or also FDD (frequency division duplexing) if permitted by the unlicensed frequency band.

However, it is not necessary that the base station 120 is configured to operate on the unlicensed frequency band, it suffices that the base station 120 is configured to use user equipment assisted deployment of unlicensed cells, i.e. to utilize one or more user equipments to provide information used by the base station in the deployment of one or more unlicensed cells (spectrum). For that purpose the base station 120 comprises a deployment unit 121 that comprises, as sub-units, a triggering unit (TRIGGER-u) 122 and a timing unit (TIMING-u) 123 whose functionality will be described in more detail below. Although the units are depicted as separate units, it should be appreciated that the units may be integrated with each other.

In the example of FIG. 1, evolved node Bs (U-eNB1, U-eNB2) 130, 130' depict base stations providing secondary cells (SCells) and are configured to operate on the unlicensed frequency band(s), each such base station providing one or more unlicensed band cells, either as SCells for a carrier aggregation with the licensed band primary cell (PCell), i.e. to be used together, or as part of a standalone unlicensed network. The evolved node B operating on the unlicensed band(s) may provide a small cell such as a pico cell or micro cell. Further, a base station operating on the unlicensed band(s) may be WLAN access point, like a Wi-Fi hot spot, or a wireless personal area network (WPAN) access point, or a free-space optical communications access point using infrared, or a WiMAX access point that may provide a rather large cell, for example. Hence, the type of the base station providing a secondary cell and operating on the unlicensed band(s) is irrelevant, it suffices that the base station is capable of providing unlicensed wireless access.

Figure 2:
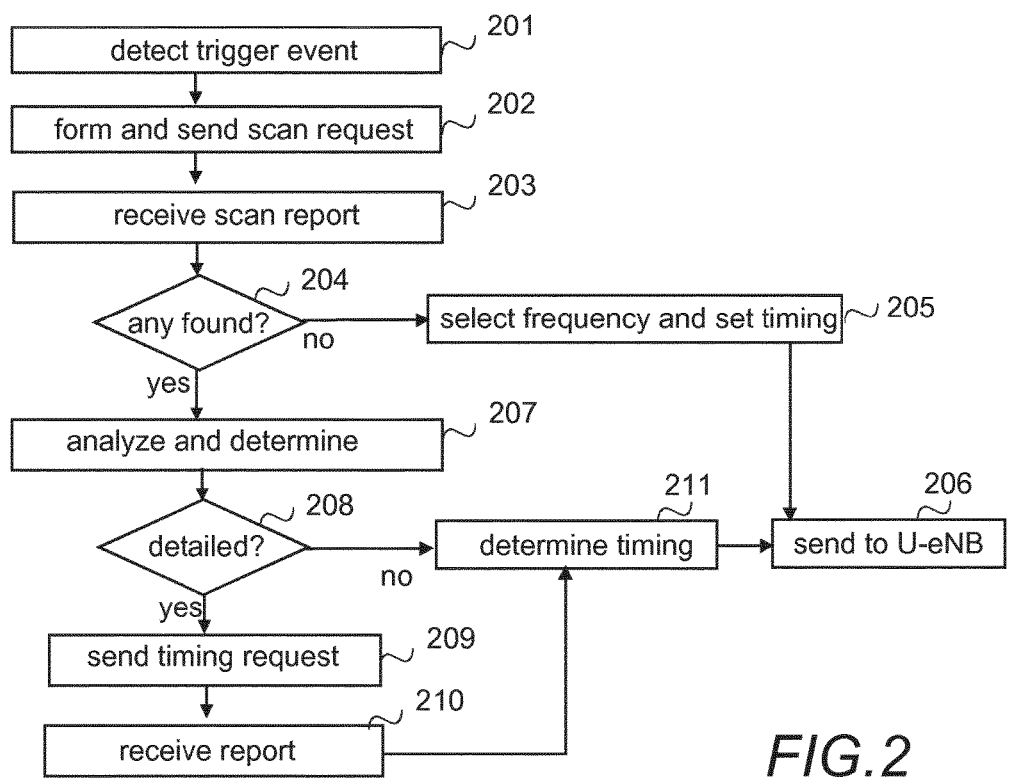
FIGS. 2 and 3 are flow charts illustrating exemplary functionalities.
Figure 3:
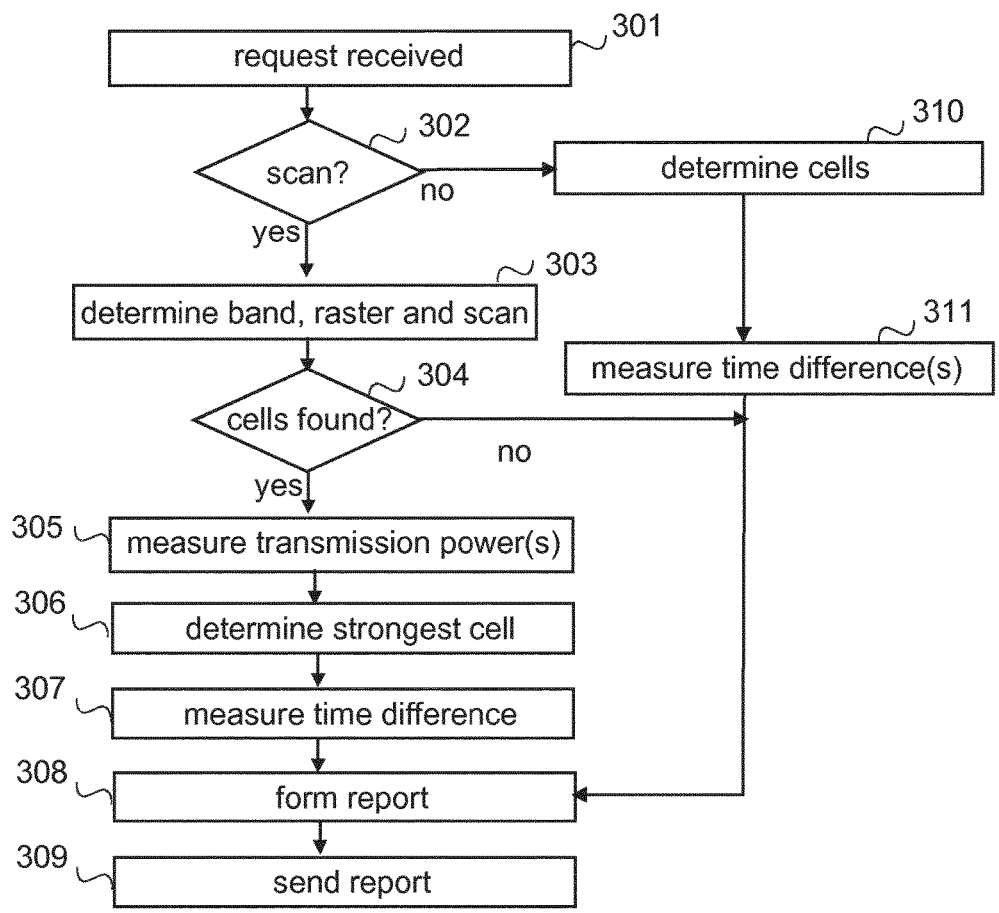

FIGS. 2 and 3 are flow charts illustrating an example of the user equipment assisted deployment of an unlicensed spectrum, FIG. 2 illustrating an exemplary functionality of an eNB providing the primary cell and FIG. 3 an exemplary functionality of an assisting user equipment.

Referring to FIG. 2, eNB providing the primary cell, or more precisely, the triggering unit, detects on step 201 that a trigger event for deployment of a new unlicensed cell occurs. An example of the trigger event includes that the amount of traffic to be carried within the primary cell exceeds a threshold value and there are such user equipments on the cell that support use of unlicensed band(s) aggregated with a licensed band. Therefore a scan request is formed by eNB and sent to the user equipment in step 202.

The scan request contains information on a frequency band which is to be scanned, and it may also comprise a channel raster. A channel raster or channel range refers to the steps or frequencies designated in the radio communication the distance between neighboring channels in a frequency band or frequency bands. It is also possible that the channel raster is pre-set to user equipments, and hence there is no need to send it to user equipments from eNB. For example, for LTE bands a channel raster 100 kHz has been defined for frequency bands in 3GPP specification. Nevertheless, any raster may be used. In another implementation, the scan request message may itself indicate the frequency band(s), in which case there is no specific raster indicated. For example, "scan unlicensed band for LTE" request may indicate that the band to be scanned is the 120 MHz band from 5.725 GHz to 5.850 GHz. However, it should be appreciated that the frequency band(s) to be scanned may be any other unlicensed frequency band segment(s).

The scan request is sent to one or more user equipments. The request may be sent to multiple user equipments in order to obtain good statistics of the interference situation on the unlicensed band. The user equipments to which the scan request is sent are preferably selected so that, in addition to the user equipment's support for operation on such an unlicensed band also the traffic volume of the user equipment capable operating with the unlicensed band is considered. For a user equipment with a high traffic volume the aggregation with the unlicensed band is likely to be attractive to reach higher data throughput than the data throughput achievable with the licensed band only. However, the scan request may be sent to any user equipment regardless of its actual transmission needs, and the scan request may be sent to all user equipments available, which are capable of operating on the unlicensed band, within the primary cell. In the illustrated example it is assumed, for the sake of clarity, that the scan request is sent by eNB to one user equipment.

In the illustrated example it is assumed that after a while a scan report is received in step 203 from the user equipment. It should be appreciated that if a scan report is not received within a predetermined time, the scan request is either resend or send to another user equipment.

Then eNB providing the primary cell, or more precisely, the timing unit, checks in step 204, whether or not the report contains any cell information on the unlicensed band. If no cells were found on the unlicensed band, for example, the scan report may be empty, a new cell on the unlicensed band may be set up in step 205 by selecting a frequency on the unlicensed band (without being predefined), or more precisely a center frequency or a carrier frequency, by setting a timing of the new cell on the unlicensed band, and by selecting a physical cell identifier for the new cell on the unlicensed band. The timing can be set in step 205 without considerations of interference issues on the unlicensed band. The physical cell identifier is just selected, for example in LTE there are 504 different values that differentiate the different cells with the primary and secondary synchronization signals (PSS and SSS) amongst which the physical cell identifier is selected. The set up information, i.e. the selected frequency, the timing for the selected frequency and the physical cell identifier are then sent by eNB in step 206 to the base station operating on the unlicensed band to set up the cell. Then the base station operating on the unlicensed band may start to transmit one or more radio frames with necessary signals that allow the user equipment, for example, to measure and synchronize to the cell on the unlicensed band and then later, when the new cell is configured with carrier aggregation as the SCell or the user equipment has been moved to the new cell on the unlicensed band with a handover in case the unlicensed band is used as the primary cell, to receive data.

If there is cell information on the unlicensed band (step 204) indicated in the scan report, the information is analyzed by eNB in step 207. In the illustrated example the scan report may contain physical cell identifiers (PCIs) and RSRP (Reference Signal Received Power) that indicates measured average received power over the resource elements that carry cell-specific reference signals within certain frequency bandwidth for the cell found in the scan. The scan report may also contain global cell ID (identity), PLMN ID (identity identifying network/operator) or RSRQ (Reference Signal Received Quality) for the cell found in the scan. PLMN ID may be useful, especially when LTE-U operators, for example, share the same spectrum either fully or in a partially overlapping manner. The scan report may also indicate an empty cell, since if there may be no transmission in a particular location on the unlicensed band, the scan report may not show any PCI, global cell ID, PLMN ID, RSRP or RSRQ for the particular location, and hence there is an empty cell. Thanks to this information, eNB providing the primary cell, i.e. eNB operating on the licensed spectrum receives information on a new base station on the unlicensed band even when the center frequency or the carrier frequency of the new base station is not predefined. Further, in the illustrated example the scan result also comprises a frame timing difference measurement result (timing information) between the strongest cell on the unlicensed band and the primary cell provided by eNB. In addition to or alternatively, the scan result may comprise frame timing difference measurement results between the strongest cell of a given operator (indicated by a given PLMN ID in the scan request, for example), or between the strongest cell of each found operator during the scanning, on the unlicensed band and the primary cell provided by eNB. This facilitates synchronization and interference coordination in a multi-operator environment, especially when two or more different operators using TDD operation are involved: without synchronization uplink/downlink interference may occur.

By analyzing the information received, it is possible to determine (step 207) one or more cells, i.e. sub-bands or carrier frequencies, to offset on the unlicensed band. Further, it is possible to determine, whether or not more detailed information is needed. For example, eNB providing the primary cell, or the timing unit, may be configured to request for frame timing difference measurements of an empty cell, or in case there is more than one empty cell, for each empty cell, and/or for frame timing difference measurements to adjacent cells of the strongest cell (i.e. for co-channels around the intended channel), and/or for an intended cell other than the strongest or empty, possibly also to adjacent cells. If it is determined that the more detailed information is needed (step 208), a timing request is sent in step 209 to the user apparatus. The timing request indicates the cell(s) for which frame timing difference measurements should be performed.

In the illustrated example it is assumed that after a while a report containing requested frame timing difference measurements is received in step 210 from the user equipment. It should be appreciated that if the report is not received within a predetermined time, the request resend. With the information it is possible to determine (211) timing for the selected cell (carrier frequency) and transmission power level. In other words, the transmission of the unlicensed base station may be placed on a certain carrier frequency on the unlicensed frequency band with a specific timing aligned on adjacent one or more frequencies. The advantage is to have a transmission link with the smallest amount of interference and avoiding uplink/downlink interference regardless of whether the interference source is a base station of the same operator or of another operator.

The determined timing for the selected frequency is then sent in step 206 to the base station operating on the unlicensed band providing the selected cell on the unlicensed band. Then the base station operating on the unlicensed band may start to transmit the frame(s) with the necessary signals, as described above.

If no detailed information is needed (step 208), for example the strongest cell is chosen and no information on adjacent cells is needed, the process proceeds to step 211. In another implementation the scan report does not contain timing difference information, and the step 208 is skipped over unless the configuration defines that for deploying an empty cell no timing difference information is needed.

Referring to FIG. 3, when a user equipment receives in step 301 a request from the primary cell, it is checked in step 302, whether or not the request is a scan request. For example, the assisting unit may detect the request and decide whether to forward it to the scanning unit or to the time measurement unit, if they are implemented as separate units.

If the request is a scan request (step 302), the user equipment, or more precisely, the scanning unit, the unlicensed band to be scanned is determined in step 303 as well as the channel raster to be used in the scanning. As described above, the request may contain both the frequency band and the channel raster, or indicate one or both of them, in which case the values may be preconfigured to the user equipment. Then the whole unlicensed band available is scanned in step 303 by using synchronization signals, for example, like the above described PSS and SSS, or cell search signals. In other words, a blind scanning of the unlicensed band may be performed. That has the advantage that the user equipment is able to find out all cells on the band regardless of the operator(s) of the cells.

If one or more cells are found on the unlicensed band (step 304) during the scan, transmission power of each found cell is measured in step 305 by the scanning unit. The transmission power may be determined, for example, by using measurements defined for handover or cell selection/reselection. It should be appreciated that any measurement that indicates directly or indirectly the interference situation may be used regardless of the original purpose of the measurement. In the illustrated example it is assumed that, as described above, RSRP measurements are performed. In LTE it is also possible to perform, alternatively or in addition to RSPP measurement, RSRQ (Reference Signal Received Quality) measurements that indicate the quality of the received reference signal. It should be appreciated that for an empty cell broadcasting synchronization signals, or cell search signals, so that it is detectable by any user equipment, no transmission power is measured since there is no transmission wherefrom to measure it. Yet another example what the scan report may include is Reference Signals Signal Interference Noise Ratio (RS-SINR), which has been suggested to be added in 3GPP specifications for other purposes.

After the transmission powers are measured for the cells on the unlicensed band, the cell providing the strongest transmission power is determined or selected in step 306, and a frame timing difference (time difference) between the strongest cell identified on the unlicensed band and the primary cell on the licensed band, for example, is measured in step 307 by the time measurement unit. The frame timing difference measurement is performed in order to help the configuration of a secondary cell on the unlicensed band, for example. Since in the illustrated example the frame timing difference measurement is performed automatically, i.e. without a specific request, to the strongest cell on the unlicensed band, in a case in which the strongest cell on the unlicensed band is chosen to be the secondary cell and no additional information is required, a little bit less signaling is needed. In the illustrated example, the frame timing difference measurement is based on frame timing difference measurements used in WCDMA (Wideband Code Division Multiple Access) for soft handover configuration. For example, UTRA (UMTS Radio Access) SFN-SFN (system frame number-system frame number) observed frame timing difference measurement type 1 or type 2, as defined in a 3GPP specification TS25.215 "Physical layer; Measurements (FDD)", version 11.0.0, may be used. The type 1 gives difference which is n times 10 ms+the detailed difference in the actual frame timing while the type 2 only gives the frame timing difference (when the frame boundary starts and thus never exceed 10 ms (as a frame length in UTRA is 10 ms).

When the frame timing difference measurement is performed, a report including the scanning results and timing information from the frame timing difference measurement is formed by the user equipment in step 308 and send in step 309 from the user equipment to eNB providing the primary cell. For example, the timing information may be formed with using middle 6 PRB (physical resource block) resolution since the PSS and SSS span over the middle 6 PRBs. Hence, one needs to consider only 1.08 MHz spectrum around the center frequency to perform a frame timing difference measurement for a system bandwidth up to 20 MHz.

If no cell is found during the scanning (step 304), a report indicating that there are no cells on the unlicensed band is formed by the user equipment in step 308 and send in step 309 from the user equipment to eNB providing the primary cell. Such a report may include only RSSI (Receive Strength Signal Indicator) for certain parts of the unlicensed band with certain steps, for example RSSI for every 180 kHz, or for every 1.08 MHz or for even higher pieces, like for every 5 MHz.

If the request is not a scan request (step 302), in the illustrated example it is assumed that the request is a time difference request comprising physical cell identifiers of the cells for which the frame timing difference measurements are requested. Therefore the one or more cells for which the time difference should be measured are determined in step 310 by the time measurement unit. However, in some other implementations the time difference request may contain also other information, like an indication to perform also RSRQ measurements for all cells or for some specific cell(s), or an indication to perform also both RSRP measurements and RSRQ for all cells or for some specific cell(s).

Then for each determined cell on the unlicensed band the frame timing difference (a time difference) between the cell on the unlicensed band and the primary cell on the licensed band, for example, is measured in step 311 in a way described above with step 307, and a report containing the requested timing information is formed by the time measurement unit in step 308 and sent in step 309 from the user equipment to eNB providing the primary cell.

In another implementation, no frame timing difference measurements are performed in response to a scan request. In the implementation, steps 306 and 307 are omitted.

Figure 4:
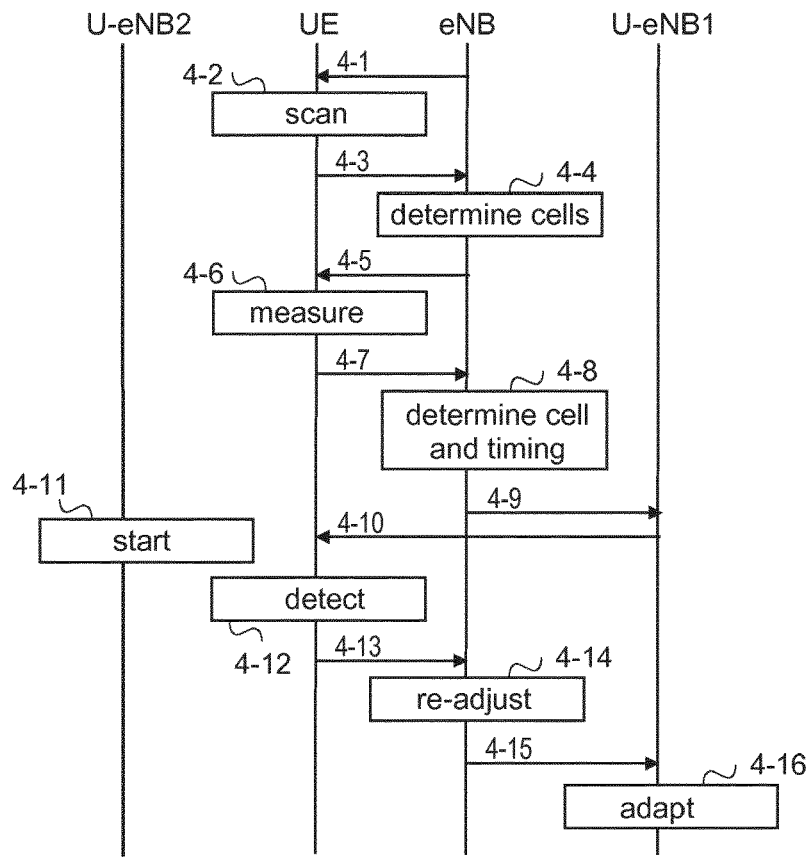
FIG. 4 is a signaling chart illustrating exemplary signaling.

FIG. 4 illustrates signaling according to another exemplary implementation in which automatic neighbor relation (ANR) style measurements are implemented. More precisely, in the implementation, as in ANR, one or more physical cell identifiers are reported first, and then more information is provided only if requested. In the example of FIG. 4, it is assumed for the sake of clarity that only one user equipment UE is involved. Further, in the illustrated example, the broadcast transmissions of physical cell identifiers (PCI) and the primary and secondary synchronization signals (PSS and SSS) from the base stations are not illustrated.

Referring to FIG. 4, when the base station eNB providing the primary cell, or more precisely, the triggering unit, detects that a trigger event for deployment of a new unlicensed cell occurs, it forms a scan request and sends the scan request in message 4-1. In the illustrated example it is assumed that the scan request contains information indicating an unlicensed frequency band which is to be scanned, and an associated channel raster to be used.

In response to receiving message 4-1, UE, or more precisely the scanning unit, scans, in point 4-2, the unlicensed band using the received channel raster, and forms a corresponding scan report. In the illustrated example it is assumed that at least one unlicensed cell, provided by a base station U-eNB1 operating on the unlicensed band, is found, but that a base station U-eNB2 may be not yet in operation. In the illustrated example the scan report contains a PCI for each found cell and an RSRP for each non-empty cell on the unlicensed frequency band. After the scanning the scan report is sent in message 4-3 to eNB.

In response to receiving message 4-3, eNB, or more precisely the timing unit, analyzes the scan report and determines in point 4-4 one of the cells on the unlicensed frequency band as the intended cell for offloading], and in the illustrated example then determines in point 4-4 adjacent cells of the intended cell, and adds PCIs of the cell on the unlicensed frequency band to a request for frame timing difference measurements. In the illustrated example, the intended cell on the unlicensed frequency band may be an empty cell, if the scan report indicates that there is an empty cell in, or if more empty cells are indicated on the unlicensed frequency band, each of them may be determined as the intended cell. If there is no empty cell, then the strongest cell identified on the unlicensed frequency band is selected as the intended cell. However, any cell, and any amount of cells, even all the cells, may be determined to be a cell whose PCI is added to the request for frame timing difference measurements. The request for frame timing difference measurements is then send in message 4-5 to UE.

In response to receiving message 4-5, UE, or more precisely the time measurement unit, performs in point 4-6 frame timing difference measurements for each cell whose PCI is in message 4-5, and sends the results in message 4-7 to eNB.

In response to receiving message 4-7, eNB, or more precisely the timing unit, analyzes the results and determines in point 4-8 the cell and the timing to be used in the cell on the unlicensed frequency band, as described above, and sends the information in message 4-9 to U-eNB1 which then may start to transmit (by messages 4-10, only one shown in FIG. 1) one or more frames with necessary signals that allow UE to measure and synchronize to the cell on the unlicensed frequency band.

Meanwhile U-eNB2 starts in point 4-11 transmission including PSS and SSS transmission, for example. UE, or more precisely the scanning unit in UE, may be configured to perform continuously intra-frequency measurements, i.e. measurements on the center frequency UE is receiving data, on the unlicensed band within the frequencies of the cells with which UE may synchronize. this refers to the case that SCell on the unlicensed cell has been earlier already configured (i.e. found during the scan) and then UE is performing measurements to detect if some other cell becomes active, or UE moves closer to another cell which UE has not heard earlier. UE may be configured to perform additional inter-frequency measurements in close by frequencies, i.e. other possible center frequencies than the frequency UE is currently using. Thanks to the measurements, UE detects in point 4-12 a co-channel provided by U-eNB2, and reports PCIs and possible RSPR for each PCI to eNB in message 4-13.

In response to message 4-13, eNB, or more precisely, the timing unit, determines whether or not frame timing difference measurements on any PCI is needed. The frame timing difference measurements may not be needed if a big part of the unlicensed spectrum is found with no LTE unlicensed transmission. For example, in the 120 MHz of spectrum, cells in U-eNB2 are found only for 40 MHz of the spectrum, an unlicensed cell in U-eNB1 some 20 MHz or more away from the closest transmitter in U-eNB2 in the frequency domain is expected to have a small enough emission, and therefore timing synchronization is not necessary. In the illustrated example it is assumed that the timing synchronization is not necessary, and therefore no frame timing difference measurements are requested. However, in the illustrated example in point 4-14 a re-adjustment of the selected frequency (i.e. the cell) and the timing is performed, for example by shifting the cell determined in point 4-8 to an adjacent cell for which frame timing difference measurement results were obtained in message 4-7, and using the result to adjust the timing. When the re-adjustment has been determined, updated values are sent in message 4-15 to U-eNB1 which adapts in point 4-16 its transmission (messages 4-10) correspondingly.

However, if the timing synchronization is determined to be necessary, or if eNB, or more precisely the timing unit, is configured to always, when information on a new (not earlier detected) PCI is received from UE, to request the frame timing difference measurements, before point 4-14 a request corresponding to the request sent in message 4-5 is sent to UE, and the possible re-adjustment is performed using also corresponding results.

Although not mentioned above, the messages may be RRC (radio resource control) signaling messages.

It should be appreciated that although in the above examples illustrated in FIGS. 2, 3 and 4, a scan request triggers one blind scanning, a scan request may also trigger a periodic blind scanning in the user equipment. The time period between two consecutive blind scanning may be a predefined time in the user equipment or sent in the scan request and/or updated/sent in a related message. The periodic blind scanning may be performed certain amount of times (predefined or sent in the request, for example) and/or until the base station that requested the periodic blind scanning cancels the request and/or the request may have a certain lifetime (predefined or sent in the request, for example) expiry of which the user equipment is configured to monitor and not to perform the blind scanning after the expiry.

Although in the above term "frame timing difference measurement" is used, a corresponding term, like "frame time difference measurement", "time difference measurement" or "timing difference measurement", may be used as well for information/measurement with which it is possible to determine timing for a selected center frequency. Further, it should be appreciated that the timing information may comprise various cell-specific timed events such as, for example, symbol timing, slot timing, sub-frame timing, half-frame timing, and/or frame timing.

The steps/points, messages and related functions described above in FIGS. 2, 3 and 4 are in no absolute chronological order, and some of the steps/points may be performed simultaneously or in an order differing from the given one. Other functions can also be executed between the steps/points or within the steps/points, and other messages sent. For example, if a pre-set raster is used in point 4-2 the user equipment retrieves the value of the pre-set raster and then performs the scanning. Some of the steps/points/messages or part of the steps/points/messages can also be left out or replaced by a corresponding step/point or part of the step/point. For example, if no re-adjustment is needed in point 4-14, no message 4-15 is sent and no adaptation (point 4-16) takes place. The messages are only exemplary and may even comprise several separate messages for transmitting the same information.

Figure 5:
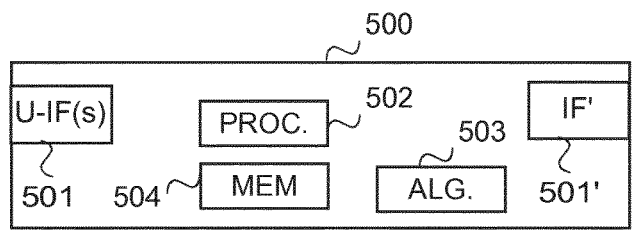
FIGS. 5 and 6 are schematic block diagram of the exemplary apparatuses.

FIG. 5 is a simplified block diagram illustrating some units for a user apparatus 500 configured to assist in the deployment of an unlicensed band, i.e. an user equipment providing at least the assisting unit and/or the scanning unit and the time measurement unit and/or one or more units configured to implement at least some of the functionalities described above. In the illustrated example, the user apparatus comprises one or more user interfaces (U-IF(s)) 501 for receiving user inputs and/or outputting information to the user, one or more interfaces (IF) 501' for receiving and transmitting information over the air interface(s), a processor 502 configured to implement at least some functionality described above with a corresponding algorithm/algorithms 503, and memory 504 usable for storing a program code required at least for the implemented functionality and the algorithms. The memory 504 is also usable for storing other information.

Figure 6:
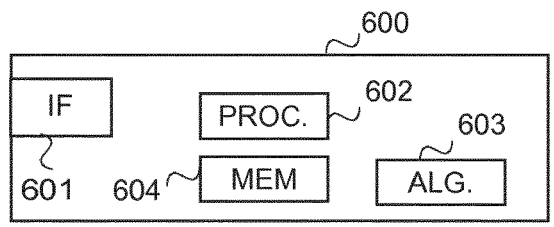

FIG. 6 is a simplified block diagram illustrating some units for a network apparatus 600 configured to provide a primary cell and to deploy an unlicensed band, i.e. a base station providing at least the deployment unit and/or the triggering unit and the timing unit and/or one or more units configured to implement at least some of the functionalities described above. In the illustrated example, the network apparatus comprises one or more interfaces (IF) 601 for receiving and transmitting information over the air interface(s), a processor 602 configured to implement at least some functionality described above with a corresponding algorithm/algorithms 603, and memory 604 usable for storing a program code required at least for the implemented functionality and the algorithms. The memory 604 is also usable for storing other information, like temporarily the PCIs and different measurement results.

In other words, both the user apparatus and the network apparatus, or any apparatus configured to provide one or more corresponding functionalities, is a computing device that may be any apparatus or device or equipment configured to perform one or more of corresponding apparatus functionalities described with an embodiment/example/implementation, and it may be configured to perform functionalities from different embodiments/examples/implementations. The unit(s) described with an apparatus may be separate units, even located in another physical apparatus, the distributed physical apparatuses forming one logical apparatus providing the functionality, or integrated to another unit in the same apparatus.

The techniques described herein may be implemented by various means so that an apparatus implementing one or more functions of a corresponding apparatus described with an embodiment/example/implementation comprises not only prior art means, but also means for implementing the one or more functions of a corresponding apparatus described with an embodiment and it may comprise separate means for each separate function, or means may be configured to perform two or more functions. For example, the assisting unit or its sub-unit(s), and/or the deployment unit or its sub-unit(s) and/or algorithms, may be software and/or software-hardware and/or hardware and/or firmware components (recorded indelibly on a medium such as read-only-memory or embodied in hard-wired computer circuitry) or combinations thereof. Software codes may be stored in any suitable, processor/computer-readable data storage medium(s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions described herein. Software codes may be stored in any suitable, processor/computer-readable data storage medium(s) or memory unit(s) or article(s) of manufacture and executed by one or more processors/computers.

The user apparatus, and/or the network apparatus, and/or any apparatus configured to provide one or more corresponding functionalities, may generally include a processor, controller, control unit, micro-controller, or the like connected to a memory and to various interfaces of the apparatus. Generally the processor is a central processing unit, but the processor may be an additional operation processor. Each or some or one of the units and/or algorithms described herein may be configured as a computer or a processor, or a microprocessor, such as a single-chip computer element, or as a chipset, including at least a memory for providing storage area used for arithmetic operation and an operation processor for executing the arithmetic operation. Each or some or one of the units and/or algorithms described above may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments/implementations. In other words, each or some or one of the units and/or the algorithms described above may be an element that comprises one or more arithmetic logic units, a number of special registers and control circuits.

Further, an apparatus implementing functionality or some functionality according to an embodiment/example/implementation of the user apparatus, and/or the network apparatus, or any apparatus configured to provide one or more corresponding functionalities, may generally include volatile and/or non-volatile memory, for example EEPROM, ROM, PROM, RAM, DRAM, SRAM, double floating-gate field effect transistor, firmware, programmable logic, etc. and typically store content, data, or the like. The memory or memories may be of any type (different from each other), have any possible storage structure and, if required, being managed by any database management system. The memory may also store computer program code such as software applications (for example, for one or more of the units/algorithms) or operating systems, information, data, content, or the like for the processor to perform steps associated with operation of the apparatus in accordance with examples/embodiments. The memory, or part of it, may be, for example, random access memory, a hard drive, or other fixed data memory or storage device implemented within the processor/apparatus or external to the processor/apparatus in which case it can be communicatively coupled to the processor/network node via various means as is known in the art. An example of an external memory includes a removable memory detachably connected to the apparatus.

The user apparatus, and/or the network apparatus, or any apparatus configured to provide one or more corresponding functionalities, may generally comprise different interface units, such as one or more receiving units for receiving user data, control information, requests and responses, for example, and one or more sending units for sending user data, control information, responses and requests, for example. The receiving unit and the transmitting unit each provides an interface in an apparatus, the interface including a transmitter and/or a receiver or any other means for receiving and/or transmitting information, and performing necessary functions so that the control information, etc. can be received and/or sent. The receiving and sending units may comprise a set of antennas, the number of which is not limited to any particular number.

Further, the user apparatus, and/or the network apparatus, or any apparatus configured to provide one or more corresponding functionalities, may comprise other units, such as one or more timers for the periodic blind scanning.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   providing a primary cell on a licensed band to a user apparatus;
   sending, to the user apparatus, a message indicating a request to scan an unlicensed band with a raster;
   receiving, from the user apparatus, scan results indicating one or more cells on the unlicensed band, and timing information measurements on the one or more cells on the unlicensed band;
   using the scan results to select a carrier frequency for a secondary cell on the unlicensed band;
   using received timing information measurements for determining timing information for the secondary cell;
   sending, to a network apparatus providing the secondary cell, information on the secondary cell and the timing;
   receiving, from the user apparatus, a message indicating a newly detected network apparatus providing one or more new cells on the unlicensed band;
   determining whether or not to readjust the secondary cell because of the one or more new cells; and
   if readjustment is needed, readjusting information on the secondary cell, and sending the readjusted information to the network apparatus providing the secondary cell.

2. A method as claimed in claim 1, wherein the timing information measurements comprise measuring a timing difference between the primary cell and one or more cells on the unlicensed band.

3. A method as claimed in claim 1, wherein the timing information measurements are received in response to sending to the user apparatus a message indicating at least one cell indicated in the scan results and requesting timing information measurement results on indicated cells.

4. A method as claimed in claim 1, further comprising selecting a frequency indicated as empty in the scan results to be the carrier frequency for the secondary cell.

5. A method as claimed in claim 1, wherein the cell identified as a strongest one on the unlicensed band or as a strongest one for a specific public land mobile network identification on the unlicensed band in the scan results is the cell for which the timing information measurement results are received.

6. A method comprising:
   receiving, over a primary cell on a licensed band, from a network apparatus providing the primary cell, a request to scan an unlicensed band;
   scanning the unlicensed band using a raster;
   sending as scan results information on one or more found cells on the unlicensed band and timing information measurements on the one or more found cells on the unlicensed band to the network apparatus; and
   sending a message indicating a newly detected network apparatus providing one or more new cells on the unlicensed band to the network apparatus, wherein the message comprises information associated with determining whether or not to readjust a secondary cell because of the one or more new cells.

7. A method as claimed in claim 6, wherein at least one of:
the scanning comprises determining for each found cell on the unlicensed band a transmission power used in the cell;
the timing information measurements comprise measuring a timing difference between the primary cell and one or more cells on the unlicensed band;
the timing is frame timing; and
wherein the raster is either sent in the request to scan an unlicensed band or a predefined raster that is not sent in the request is used.

8. A method as claimed in claim 6, wherein timing information measurements are done for the cell identified as a strongest one on the unlicensed band or as a strongest one for a specific public land mobile network identification on the unlicensed band in the scan results.

9. A method as claimed in claim 6, wherein the timing information measurements are done in response to receiving from the network apparatus a request for measuring a timing information for one or more cells indicated in the request.

10. A method as claimed in claim 6, further comprising:
monitoring the unlicensed band after the scanning;
detecting one or more new cells on the unlicensed band provided by a network apparatus; and
sending information on the new cells to the network apparatus providing the primary cell.

11. An apparatus, comprising:
at least one processor; and
at least one memory including computer program code, wherein the at least one memory and the computer program code are configured to, with the at least one processor, cause the apparatus at least to:
provide a primary cell on a licensed band to a user apparatus;
send, to the user apparatus, a message indicating a request to scan an unlicensed band with a raster;
receive, from the user apparatus, scan results indicating one or more cells on the unlicensed band, and timing information measurements on one or more cells on the unlicensed band;
use the scan results to select a carrier frequency for a secondary cell on the unlicensed band;
use the received timing information measurements to determine timing information for the secondary cell;
send, to a network apparatus providing the secondary cell, information on the secondary cell and the timing;
receive, from the user apparatus, a message indicating a newly detected network apparatus providing one or more new cells on the unlicensed band;
determine whether or not to readjust the secondary cell because of the one or more new cells; and
if readjustment is needed, readjust information on the secondary cell, and send the readjusted information to the network apparatus providing the secondary cell.

12. An apparatus as claimed in claim 11, wherein the timing information measurements comprise a timing difference between the primary cell and one or more cells on the unlicensed band.

13. An apparatus as claimed in claim 11, wherein the cell identified as a strongest one on the unlicensed band or as a strongest one for a specific public land mobile network identification on the unlicensed band in the scan results is the cell for which the timing information measurement results are received.

14. A method, comprising:
receiving, over a primary cell on a licensed band, from a network apparatus providing the primary cell, a request to scan an unlicensed band;
scanning the unlicensed band using a raster;
sending as scan results information on one or more found cells on the unlicensed band and timing information measurements on the one or more found cells on the unlicensed band to the network apparatus; and
sending a message indicating a newly detected network apparatus providing one or more new cells on the unlicensed band to the network apparatus,
wherein the message comprises information associated with determining whether or not to readjust a secondary cell because of the one or more new cells.

15. A method as claimed in claim 14, wherein timing information measurements comprise measurement of a timing difference between the primary cell and one or more cells on the unlicensed band.

16. A method as claimed in claim 14, wherein timing information measurements are done for the cell identified as a strongest one on the unlicensed band or as a strongest one for a specific public land mobile network identification on the unlicensed band in the scan results.

17. A method as claimed in claim 14, wherein the timing information measurements are done in response to receiving from the network apparatus a request for measuring a timing information for one or more cells indicated in the request.

18. A computer program product comprising a program code stored in a non-transitory computer-readable medium, said program code, when run on a computer, configures the computer to:
receive, over a primary cell on a licensed band, from a network apparatus providing the primary cell, a request to scan an unlicensed band;
scan the unlicensed band using a raster;
send as scan results information on one or more found cells on the unlicensed band and timing information measurements on the one or more found cells on the unlicensed band to the network apparatus; and
send a message indicating a newly detected network apparatus providing one or more new cells on the unlicensed band to the network apparatus,
wherein the message comprises information associated with determining whether or not to readjust a secondary cell because of the one or more new cells.

* * * * *